United States Patent [19]
Hart

[11] Patent Number: 5,333,657
[45] Date of Patent: Aug. 2, 1994

[54] WORKPIECE TURING AND MILLING APPARATUS

[76] Inventor: Larry Hart, 5421 Golden Dr., Columbia, Mo. 65202

[21] Appl. No.: 959,678

[22] Filed: Oct. 13, 1992

[51] Int. Cl.$^5$ ............................. B23C 3/32; B23B 5/46
[52] U.S. Cl. .......................................... 142/24; 142/47; 142/55; 409/165
[58] Field of Search .................... 142/22, 24, 26, 37, 142/40, 41, 47, 1, 7, 55; 409/165, 166; 144/134 A, 134 C, 136 R, 136 H, 142, 154, 365; 82/131, 11, 11.1, 12, 153

[56] References Cited

U.S. PATENT DOCUMENTS

| | | | |
|---|---|---|---|
| 1,722,600 | 7/1929 | Thacher . | |
| 2,210,737 | 8/1940 | Trebert | 142/26 |
| 2,450,096 | 9/1948 | Siekmann et al. | 82/153 X |
| 2,455,662 | 12/1948 | Dyer | 90/11 |
| 2,469,262 | 5/1949 | Eggers | 82/5 |
| 3,946,774 | 3/1976 | McCord | 142/26 |
| 4,057,893 | 11/1977 | Smith et al. | 29/560 |
| 4,112,986 | 9/1978 | Strange et al. | 144/323 |
| 4,551,048 | 11/1985 | Phillips et al. | 409/197 |
| 4,611,644 | 9/1986 | Larson | 82/11.1 X |
| 4,627,477 | 12/1986 | Wise | 142/55 X |
| 5,065,802 | 11/1991 | Peterson | 144/2 |

OTHER PUBLICATIONS

Sears, Owner's Manual, Craftsman ½"Industrial Electric Drill, Model No. 315,271430, p. 1, circa Apr. 1991.
Sears, Owner's Manual, Sears-Craftsman copy Crafter, Model No. 113.249070, pp. 1, 12, Pub. Nov. 1978.
Sears, Owner's Manual, Sears-Craftsman 12"Wood-Turning Lathe Model Nos. 113.228000, 113.228160, p. 1; Pub. prior to Oct. 13, 1991.
Router Speed Control, distributed by MCLS Ltd., available prior to Oct. 13, 1991.
Steve Gellman, Efficient Spindle Turning, Fine Woodworking, pp. 71-73, Dec. 1989.
Glen Plum, Tips From Your Shop (and Ours); Wood Magazine, Jan. 1992.
Craftsmanship by the Carload, Wood Magazine, Oct. 1988.
William F. Dent, Fluting on the Drill Press, pp. 24-26, American Woodworker; Jul.-Aug. 1991.
Norman Zentil, Spiral-Routing on the Lathe, pp. 86-89, Fine Woodworking, Sep.-Oct. 1991.
Edge and Surface Treatments, Cutting Decorative Shapes in Round Stock, Date unknown.

Primary Examiner—Steven C. Bishop
Attorney, Agent, or Firm—Senniger, Powers, Leavitt & Roedel

[57] ABSTRACT

Apparatus for turning and milling a workpiece includes a frame having a chuck and a spindle spaced laterally of the chuck mounting respective opposite ends of the workplace for rotation generally about its longitudinal axis. A carriage mounting the milling device is supported by a rail on the frame for movement generally side-to-side of the frame and longitudinally of the workpiece. A first variable speed electric motor operatively connected to the chuck for driving the rotation of the workpiece about its longitudinal axis is controlled by a first control, which is used to selectively set the rotational speed of the workpiece. A second variable speed electric motor operatively connected to the carriage for driving movement of the carriage generally longitudinally of the workpiece is controlled by a second control, which is used to selectively set the speed of the carriage as it moves longitudinally of the workplace, such that spiral cuts of different predetermined configurations may be automatically made in the workpiece by the milling device by setting the appropriate relative speeds of the first motor and second motor with the first and second controls.

21 Claims, 6 Drawing Sheets

WORKPIECE TURING AND MILLING APPARATUS

BRIEF SUMMARY OF THE INVENTION

This invention relates generally to wood turning machines and more particularly to a machine for simultaneously turning and milling a workpiece.

An ordinary wood lathe having a stationary cutting tool is substantially limited to forming designs in the workpiece which extend around the entire circumference of the workplace. However, to make a longitudinally extending cut in the workpiece (e.g., for fluting) a milling device is needed. Of course, when fluting the workpiece, the workpiece does not rotate about its longitudinal axis as when turning the workpiece on a lathe, but is held stationary. To form decorative spiral cuts in the workpiece, the workplace must be rotated as the milling device advances along the workpiece. Precise control of the rotation of the workpiece and the translational movement of the milling device is required to produce a regular design.

Apparatus which supports a workpiece for rotation about its longitudinal axis and simultaneously supports a milling device on a carriage for movement longitudinally of the workpiece is shown by McCord, Jr., U.S. Pat. No. 3,946,774. However, rotation of the workpiece and movement of the milling device carriage longitudinally of the workpiece are manually driven by the same crank. Similarly, Dyer, U.S. Pat. No. 2,455,662 shows a milling attachment for lathes which is moved longitudinally of the workpiece as the workpiece is rotated. The milling attachment is pulled along by a compound riding on a lead screw attached by gears to the same motor which turns the workpiece. The existing apparatuses require substantial operator control, or rely on a single drive system and complicated and expensive gearing to control the relative speeds of the workpiece and milling device carriage so that they are not readily afforded by someone who does woodworking in his or her own home.

Among the several objects and features of the present invention may be noted the provision of apparatus for turning and milling a workpiece which is substantially automatic in operation; the provision of such apparatus which may be precisely controlled; the provision of such apparatus which is quickly and easily reset for making different designs in the workpiece; the provision of such apparatus which allows substantially continuous variation in the speed of rotation of the workpiece relative to the translational movement of the milling device; and the provision of such apparatus which is may be afforded by home craftsmen.

Other objects and features of the present invention will be in part apparent and in part pointed out hereinafter.

Generally, apparatus for turning and, by attachment of a milling device thereto, simultaneously milling a workpiece to form the workpiece with predetermined designs including a generally spiral cut, comprises a frame having a front, a back and laterally opposite sides. The frame includes a chuck and a spindle spaced laterally of the chuck for mounting respective opposite ends of the workpiece for rotation generally about its longitudinal axis. Carriage means adapted for mounting the milling device thereon is supported by support means on the frame for movement generally side-to-side of the frame and longitudinally of the workpiece. A first variable speed electric motor operatively connected to the chuck for driving the rotation of the workpiece about its longitudinal axis is controlled by a first control which is used to selectively set the rotational speed of the workpiece. A second variable speed electric motor operatively connected to said carriage means for driving movement of said carriage means side-to-side of the frame and generally longitudinally of the workpiece is controlled by a second control which is used to selectively set the speed of said carriage means as it moves longitudinally of the workpiece. Thus, spiral cuts of different predetermined configurations may be automatically made in the workpiece by the milling device by setting the appropriate relative speeds of the first motor and second motor with the first and second controls.

BRIEF DESCRIPTION OF THE DRAWINGS

FIG. 9 is a vertical section showing a platform attached to the apparatus for use in milling bowls and the like.

Corresponding reference characters indicate corresponding parts throughout the several views of the drawings.

DETAILED DESCRIPTION OF THE PREFERRED EMBODIMENT

Figure 1:
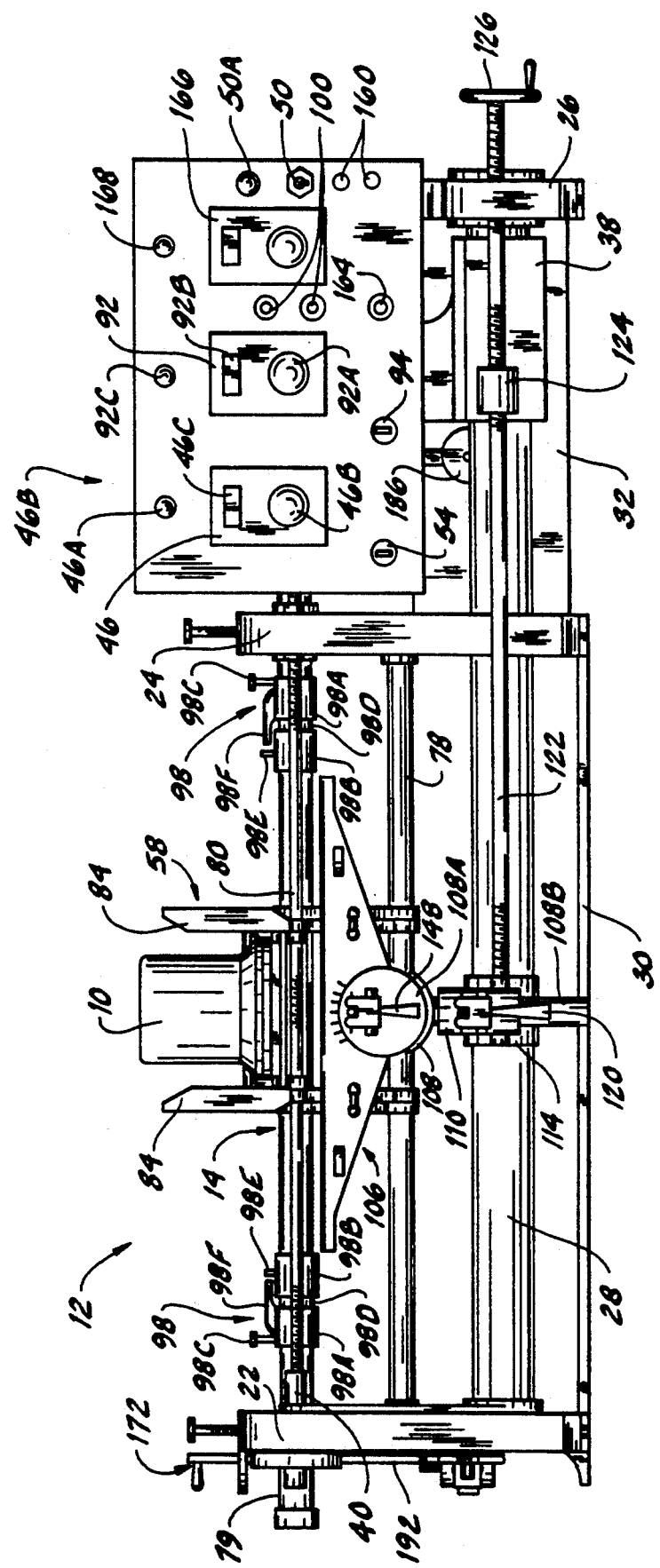
FIG. 1 is a front elevation of the turning and milling apparatus of the present invention.

Referring now to the drawings, apparatus for turning, and by attachment of a milling device such as router 10, milling a workpiece W is indicated generally by the reference numeral 12. The apparatus has a frame having a front, back and laterally spaced apart sides, designated 14, 16, 18 and 20, respectively. Three generally front to back extending frame elements, designated 22, 24 and 26, respectively, support the remaining portions of the apparatus 12, and are interconnected by a laterally extending tubular frame element 28. A laterally extending rod 30 at the rear 16 of the apparatus connects the first and second frame elements 22, 24 while a laterally extending frame element 32 connects the second and third frame elements 24, 26.

Figure 2:
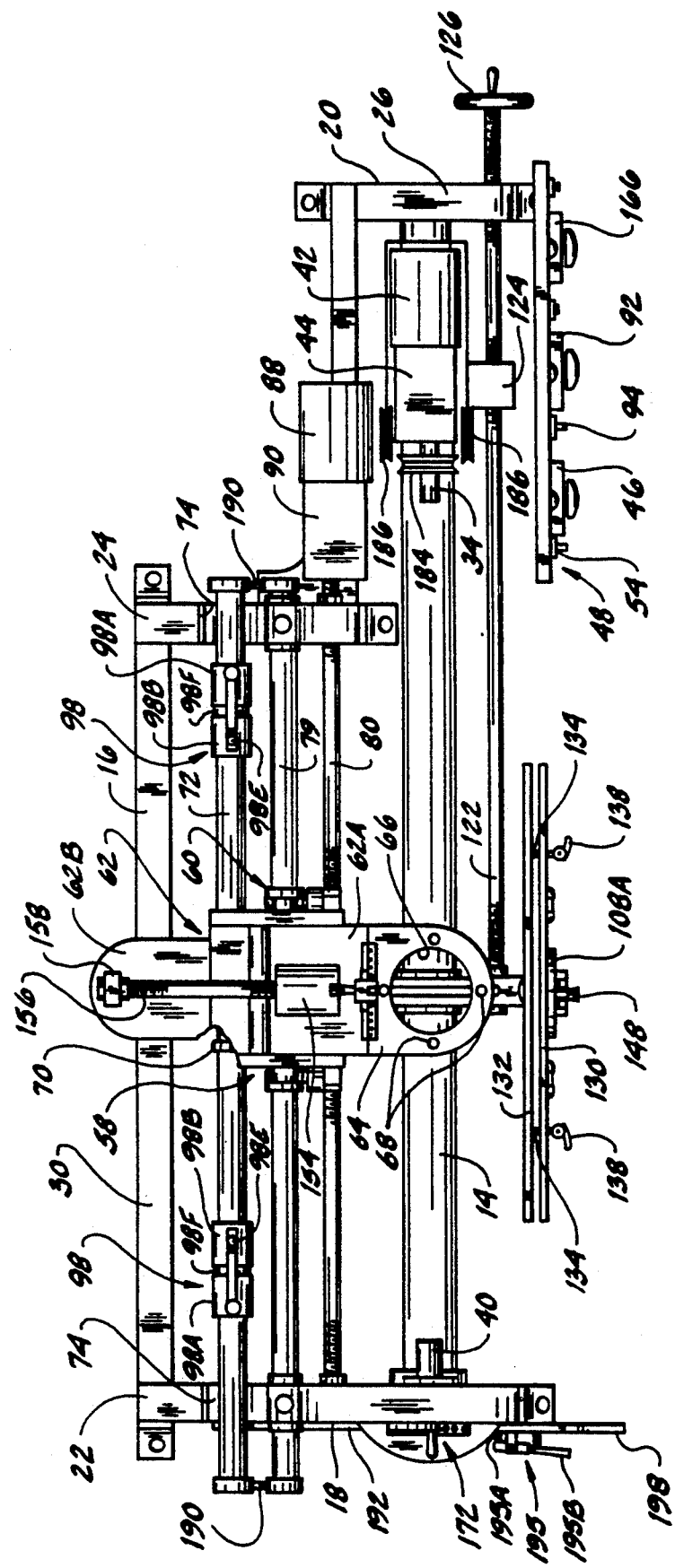
FIG. 2 is a top plan view of the apparatus of FIG. 1, but with the milling device removed to show details.
Figure 8:
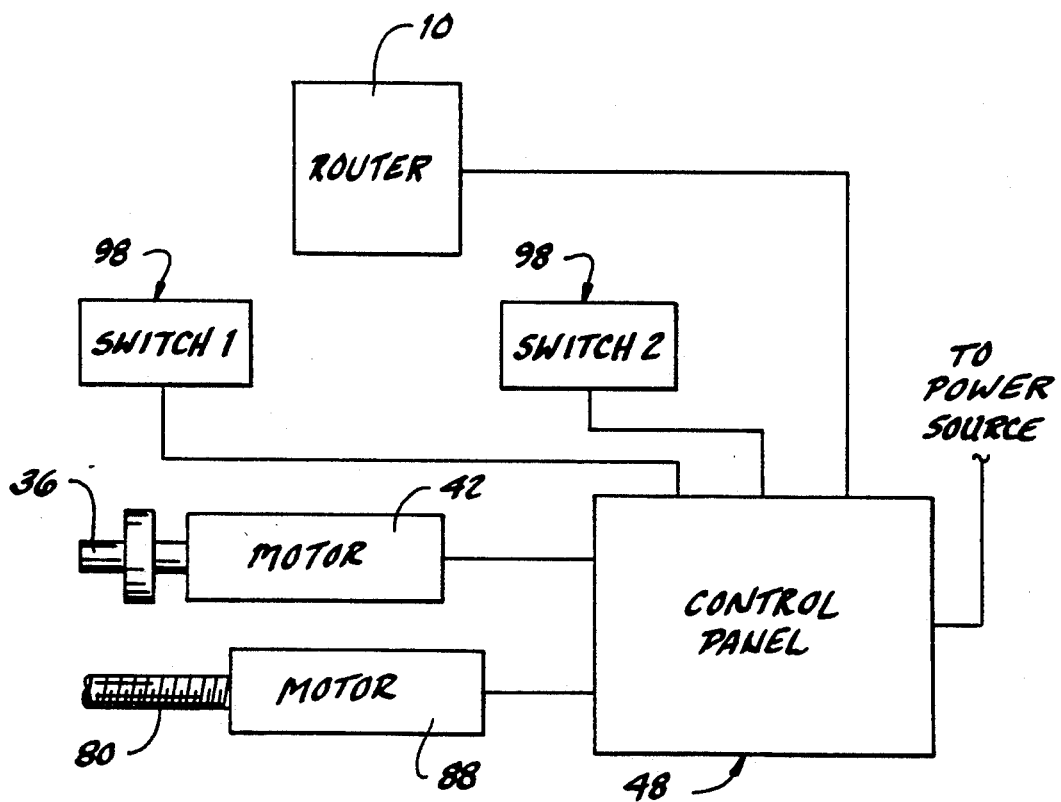
FIG. 8 is a schematic of a control system of the apparatus.

As shown in FIG. 2, the frame has a chuck 34 mounted for rotation on a pedestal 38 supported by the tubular frame element 28, and a spindle 40 mounted for rotation on the first frame element 22 and spaced laterally of the chuck. The chuck 34 and spindle 40 mount respective opposite ends of the workpiece W for rotation generally about its longitudinal axis. A first variable speed electric motor 42 mounted on a gear reduction box 44 affixed to the pedestal 38 is connected to the chuck 34 for driving rotation of the chuck to turn the workpiece W about its longitudinal axis. The first motor 42 is controlled by a first control 46 on a control panel, indicated generally at 48, mounted on the third frame element 26 (FIG. 1). The control panel 48 is connected to a power source through a power switch 50 operable to energize all of the controls on the control panel. An indicator light 50A above the power switch shows whether the control panel 48 is activated, and another indicator light 46A above the first control 46 shows whether the first motor 42 is activated. In this embodiment, the first control 46 is a first rheostat (broadly "means for selectively controlling the voltage applied to the first electric motor"), having a knob 46B and setting indicator screen 46C. As illustrated in FIG. 8, the first control 46 is connected via the control panel 48 to a power source and is operable by turning the knob 46C to change the voltage applied to the first motor 42 thereby controlling the speed of the first motor. The speed of the first motor 42, and therefore the rate of rotation of the chuck 34 and workpiece W, may be selected from a substantially continuous predetermined range of speeds. The direction of rotation of the workpiece W is selected by I flipping a toggle switch 54 below the first control 46.

A carriage, indicated generally at 58, mounts the router 10 at a location generally directly above the workpiece W (the router has been removed in FIG. 2 for clarity). The carriage 58 comprises a saddle and a router support platform (broadly "means for supporting the milling device"), indicated generally at 60 and 62, respectively. A first member 62A of the router platform 62 includes a seat 64 having an opening 66 over which the router 10 is mounted. Four holes 68 in the seat 64 around the opening 66 are provided for receiving fasteners (not shown) to attach the router 10 to the seat. The cutting blade (not shown) of the router 10 extends through the opening 66 and engages the workpiece W for milling the workpiece. A second member 62B connected to the first member 62A is mounted by a pair of rings 70 (FIG. 2 , only one is shown) attached to the underside of the second member 62B on a first support rail 72. The laterally opposite ends of the first rail are cradled in generally U-shaped recesses 74 in the first and second frame elements 22, 24. The rings 70 permit the router support platform 62 to slide lengthwise of the first rail 72 generally between the first and second frame elements 22, 24.

Figure 5:
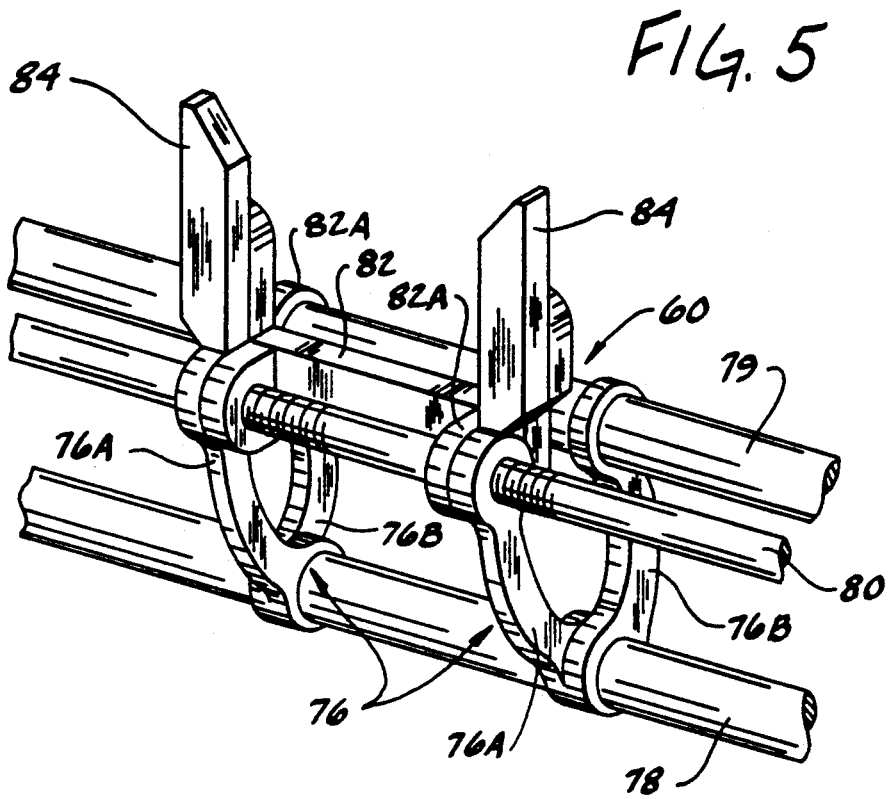
FIG. 5 is an enlarged fragmentary perspective showing a saddle of the apparatus which moves the milling device.

As shown in FIG. 5, the saddle 60 includes two brackets, each indicated generally at 76 and including a front arm 76A axed a back arm 76B. The lower ends of the front and back arms 76A, 76B of each bracket (which are formed as one piece) have a smooth bore opening through which is slidably received a second support rail 78. The back arm 76B extends upwardly from the second rail 78, and has another smooth bore opening slidably receiving a third support rail 79. The front arm 76A extends forwardly and upwardly from the second rail 78 and has a threaded opening in which a lead screw 80 extending through the opening is threadably engaged. A crosspiece 82 extending laterally between the brackets 76 has forwardly projecting lugs 82A with threaded openings which also threadably receive the lead screw 80. Thus upon rotation of the lead screw 80 in one direction, the brackets 76 and crosspiece 82 are driven by the screw in a first direction laterally of the apparatus 12, and upon rotation of the lead screw in an opposite direction they are driven in a second direction opposite the first. The portions of the arms receiving the second and third support rails 78, 79 slide along these rails as the saddle 60 is driven. Horns 84 on laterally opposite ends of the crosspiece 82 project upwardly from the crosspiece and brackets 76.

Figure 6:
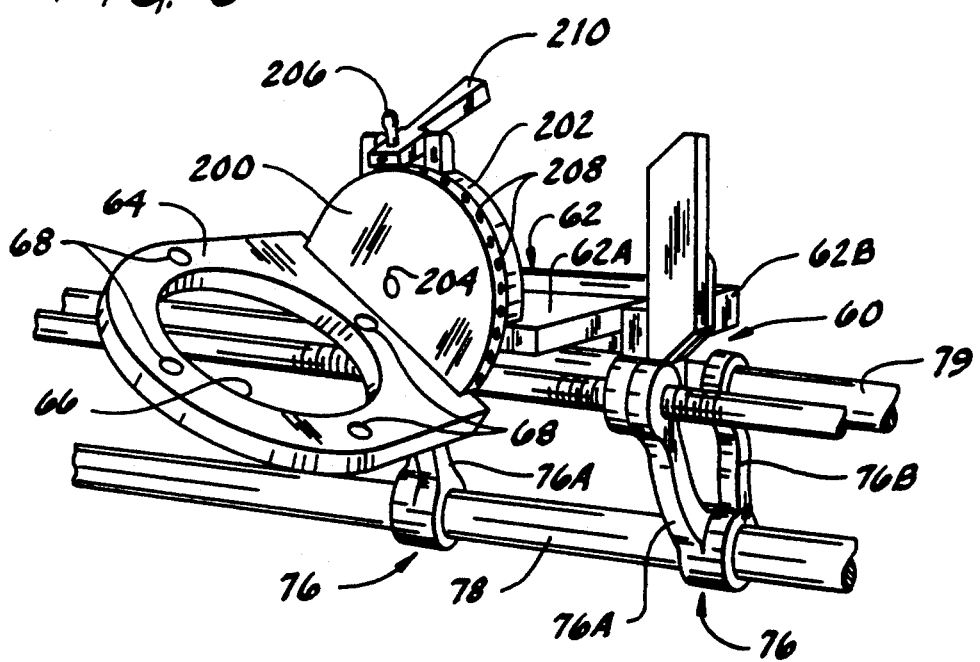
FIG. 6 is a perspective similar to FIG. 5, showing supporting structure for the milling device.

The router support platform 62 is received between the horns 84 and rests on the crosspiece 82 with the horns generally in engagement with laterally opposite sides of the platform (FIG. 6). The platform 62 is supported at its rear by the first support rail 72 and forwardly of the first rail by the crosspiece 82. The load on the crosspiece 82 is supported by the lead screw 80 to which it is attached. The front arms 76A of the brackets provide reinforcement to the lead screw 80 to support the load of the router 10. Upon rotation of the lead screw 80 the horn 84 trailing the direction of motion of the carriage 58 pushes the router support platform 62. The rings 70 of the platform 62 through which the first support rail 72 is received slide along the first rail as the platform moves.

A second variable speed electric motor 88 is operatively connected to the carriage 58 by the lead screw 80 for driving the lateral movement of the carriage. The second motor 88 is mounted on a gear reduction box 90 attached to the laterally extending frame element 32 connecting the second and third frame elements 24, 26. The first and second electric motors 42, 88 may be, for instance, ½ hp variable speed reversible drill motors of the type in Model No. 315.271430 Sears Craftsman® industrial drill sold by Sears, Roebuck & Co. of Chicago, Ill. The lead screw 80 is journalled in the first frame element 22 and the second frame element 24, and is attached to the second motor shaft (not shown) by the gear reduction box 90 for proportional rotation. The second motor 88 is controlled by a second control 92 on the control panel 48. In this embodiment, the second control 92 ( like the first) is a second rheostat (broadly "means for selectively controlling the voltage applied to the second electric motor"), having a knob 92A and setting indicator screen 92B. The second control 92 is connected to the power source and is operable by manipulation of the knob 92A to vary the voltage applied to the second motor 88 thereby controlling the speed of the second motor (FIG. 8). An indicator light 92C above the second control 92 shows whether the second motor 88 is activated. The speed of the second motor 88, and therefore the speed of the carriage 58, may be selected from a substantially continuous predetermined range of speeds. The continuously variable range of speeds is achieved by turning the knob 92A to the left. A high speed setting for rapidly moving the carriage 58 for repositioning it a start position after its run is complete is available by turning the knob 92A to the far right in a clockwise direction. The direction of movement of the carriage 58 is selected by flipping a toggle switch 94 beneath the second control 92 in the desired direction of movement.

The apparatus 12 has been designed to turn and mill the workpiece W without constant attention by an operator. To automatically stop the apparatus 12 when the carriage 58 (and router 10) reach the end of the part of the workpiece to be turned and milled, first and second limit switch assemblies, indicated generally at 98, are provided. When the carriage 58 engages one of the limit switch assemblies 98, it signals the control panel 48 to deactivate the second motor 88 so that the carriage is stopped. Each of the limit switch assemblies 98 comprises first and second tubular portions (designated by reference numerals 98A and 98B, respectively) which receive and are slidably mounted on the first support rail 72. The limit switch assemblies 98 can be slid along the first rail 72 to a desired position and then locked in place by a set screw 98C on the first portion 98A. The second portion 98B includes a sleeve 98D which is telescopically received in the first portion 98A. A spring (not shown) biases the sleeve 98D and second portion 98B outwardly away from the first portion 98A. A switch 98E operable to signal the control panel 48 to deactivate the second motor 88 is incorporated into the second portion 98B and projects upwardly from the second portion. A finger 98F on the first portion 98A extends laterally inwardly toward the switch 98E on the second portion 98B. Upon engagement of the second portion 98B by the carriage 58, the second portion is driven toward the first portion 98A, which is fixed in place by the set screw 98c, against the bias of the spring. The finger 98F engages the switch 98E causing it to trip and deactivate the second motor 88. To reactivate the second motor 88 one of a pair of override buttons 100 on the control panel 48 must be depressed. Each override button 100 is operable for one of the limit switch assemblies 98.

Figure 3:
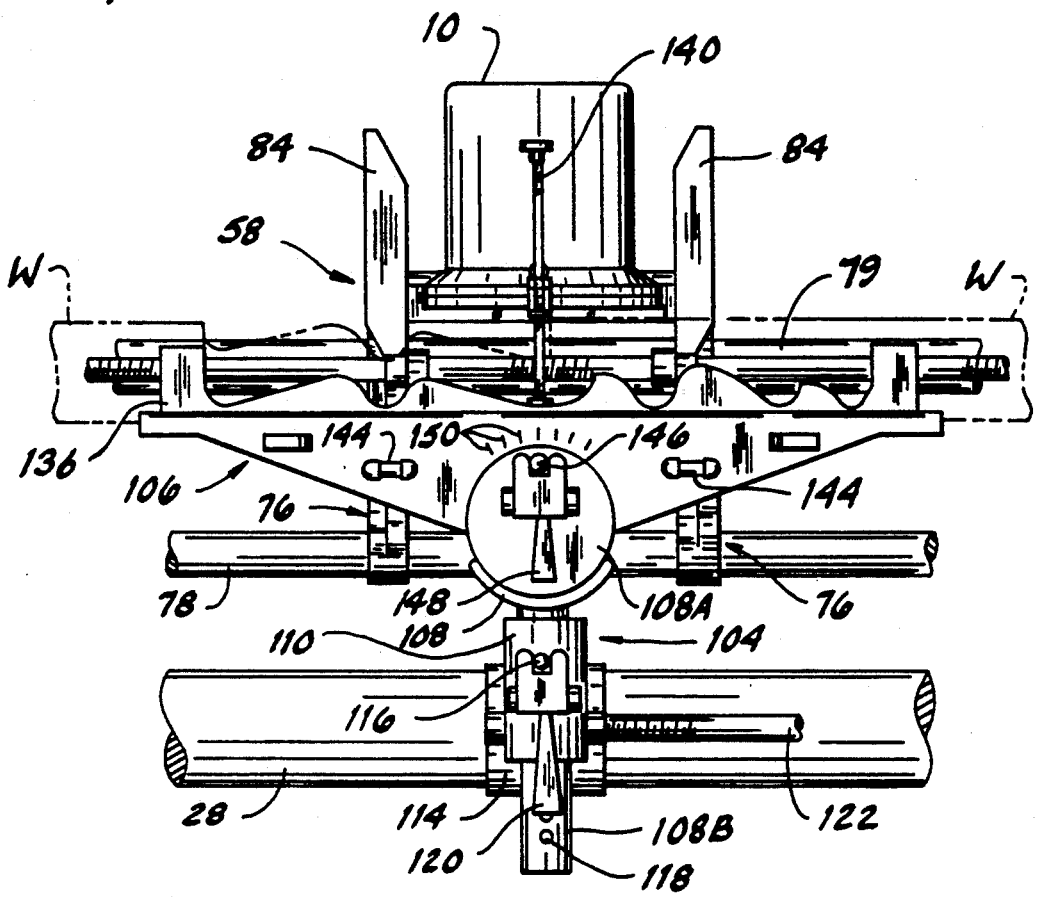
FIG. 3 is an enlarged fragmentary front elevation of the apparatus showing a pattern holder of the apparatus holding a pattern.
Figure 4:
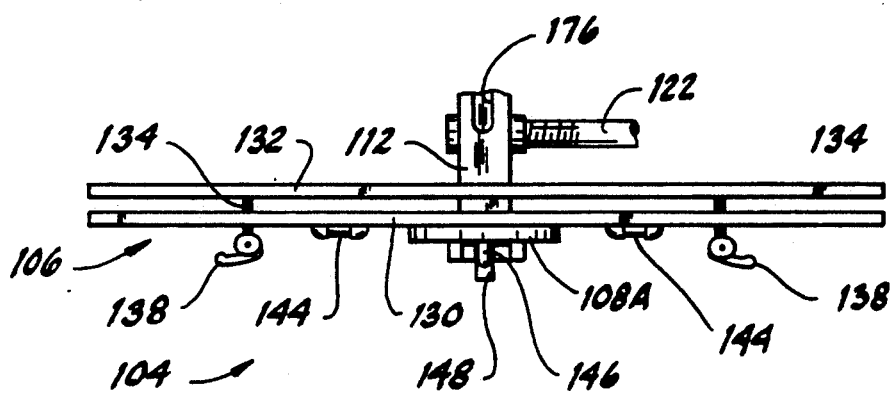
FIG. 4 is a fragmentary plan view of the holder without the pattern.

Referring now particularly to FIGS. 3 and 4, a pattern holder, indicated generally at 104, is shown to comprise a generally triangular shaped vise member designated generally by the reference number 106) pivotally mounted on a circular upper portion 108A of a foot 108. A lower cylindrical portion 108B of the foot extends down through a collar 110 which is connected by a strut 112 (FIG. 4) to a collet 114 mounted on the tubular frame member 28. The pattern holder 104 can be adjusted vertically by sliding the foot 108 in the collar 110 and locking it in place with a first latch. A pin 116 of the first latch is biased to project through an opening (not shown) in the collar 110 and into one of a plurality of vertically spaced openings 118 in the foot 108 to lock the foot in place. Depressing the lower end of a lever 120 attached to the pin 116 retracts the pin from the opening 118 and allows the foot to slide in the collar. The collet 114 is slidable along the tubular frame member 28 to position the pattern holder 104 along the length of the workpiece W. A lead screw 122 threadably engaged in an opening in the strut 112 is supported for rotation by a sleeve 124 attached to the pedestal 38 and the third frame element 26. Rotating the lead screw 122 by turning a crank 126 on its end causes the collet 114 and pattern holder 104 to move laterally of the apparatus 12.

The vise member 106 includes a pair of opposing jaws, designated by reference numerals 130 and 132, respectively, connected together by screws 134 (FIG. 4). A pattern 136 which is a two dimensional representation of a desired three dimensional design of the workpiece W may be received between the jaws 130, 132 and rest on the screws 134. The jaws 130, 132 can be drawn into engagement with the pattern 136 by turning the screws 134. To tightly clamp the jaws 130, 132 against the pattern 136 for securing the pattern in place, cams 138 mounted on the front end of the screws 134 are turned and force the jaws toward each other. A follower 140 mounted on the front end of the seat 64 of the router platform 62 is engageable with the pattern 136 and follows the contour of the pattern as the carriage 58 moves longitudinally of the workpiece W. The router platform 62 is pivoted upwardly and downwardly about the first support rail 72 as the follower 140 travels along the pattern 136 thereby changing the depth of the cut made by the router 10 to produce a three dimensional design corresponding generally to the solid of revolution of the pattern. By using the pattern 136, the operator is assured that each workpiece W (e.g., the four legs of a table) will be identical. Several patterns having different designs may be provided with the apparatus 12.

In instances where the depth of the cut in the workpiece W will be constant, the pattern holder 104 may be moved off to one side and the follower 140 adjusted so that it rides on the tubular frame member 28. However, the follower 140 may also ride on the upper edge of the vise member 106 in this situation. Level indicators 144 on the front of the vise member 106 can be used to assure that the router 10 wi11 always cut at the same depth as the follower 140 moves along the upper edge of the vise member. To make the cut progressively shallower or deeper as the carriage 58 moves from longitudinally of the workpiece W, the vise member 106 can be pivoted on the circular portion 108A of the pattern holder foot 108 so that the upper edge of the vise member makes an angle oblique to the lengthwise extension of the workpiece. The follower 140, riding on the upper edge of the vise member 106 or a pattern 136 held in by the vise member, causes the router platform 62 to move generally gradually upward (or downward) corresponding to the inclination of the vise member. The vise member 106 is held in a particular angular orientation by a second latch (broadly "means for locking said vise member") mounted on the circular portion 108A of the pattern holder. The second latch has a pin 146 which is biased to extend through an opening (not shown) in the circular portion 108A and into one opening of an arcuately arranged set of openings (now shown) in the vise member 106. By actuating a lever 148 attached to the pin 146 to withdraw the pin from the opening in the vise member 106, the vise member may be pivoted to a selected angular position relative to the circular portion 108A of the foot as indicated by marks 150 on the vise member. The lever 148 is then released to extend the pin 146 into the vise member 106 to lock it in place.

The second member 62B of the router support platform 62 is generally channel-shaped in cross section, and slidingly and telescopically receives the rearward portion of the first member 62A. A third reversible electric motor 154 mounted on the first member 62A is connected to the second member 62B by a lead screw 156 threadably engaged in a lug 158 at the rear of the second member (FIG. 2). The third electric motor 154 is controlled by a pair of buttons 160 located on the lower right hand corner of the control panel 48 in FIG. 1. Depressing the upper button 1.60 activates the third motor 154 to extend the first member 62A from the second member 62B and move the router 10 forwardly. The router 10 is moved rearwardly by depressing the lower button 160 which activates the third motor 154 to run in the opposite direction. The entire fourier support platform 62 is pivotable on the first support rail 72 about an axis extending generally side-to-side of the frame upwardly and rearwardly to remove the router 10 and platform from a position over the workplace W (direction of pivoting indicated by arrow in FIG. 7). This allows the operator to remove a completed workpiece W and mount a new one on the apparatus 12, and also to change the blade (not shown) of the router 10.

The operation of the apparatus 12 to make a spiral cut in a workpiece W (e.g., for making a table leg) is now described. The router support platform 62 and router 10 are swung up on the first support rail 72 out of the way for mounting the workpiece W on the chuck 34 and spindle 40 for rotation about its longitudinal axis. The router platform 62 is swung back down so that the router 10 is positioned directly over the workpiece. The limit switch assemblies 98 are positioned at locations corresponding to the end of the cut desired to be made in the workpiece W. Once positioned, the set screws 98C are tightened against the first rail 72 to hold the limit switch assemblies 98 in place. The router 10 can be moved to its start position by turning on the power switch 50 to energize the control panel 48, setting the direction toggle switch 94 for the direction toward the start position and turning the knob 92A on the second rheostat to move the carriage 58 rapidly toward the start position. The follower 140 is adjusted to select the depth of the cut to be made, and rides on the tubular frame member 28.

The router 10 is activated by depressing a router switch 164, and its speed is controlled by a third control 166 on the control panel. An indicator light 168 above the third control 166 shows that the router 10 is activated. Rotation of the workpiece W is set at a first speed turning the knob 46B on the first control, and the carriage 58 is set in motion by selecting a second speed using the second control 92. The speed of the carriage 58 and workpiece W are such that a predetermined spiral pattern will be made in the workpiece. Different patterns are obtained by setting the workpiece rotation and carriage movement at different relative speeds. The carriage 58 eventually engages one of the limit switch assemblies 98 at the end of its run and the second motor 88 is deactivated to stop the motion of the carriage. In order to move the carriage 58 back to its start position, one of the override switches 100 on the control panel is depressed and the second control 92 turned to the high speed operation mode of the second motor 88.

To cut a pattern in which the depth of the cut made by the router 10 varies along the length of the workpiece W, a pattern 136 is clamped in the pattern holder 104 as previously described. The follower 140 is adjusted to ride on the upper edge of the pattern so that the router support platform 62 and router 10 swing up and down as the carriage 58 moves longitudinally along the workpiece W, thereby varying the depth of cut made by the router. Cuts of generally continuously decreasing or increasing depth in the workpiece W may be made by tilting the vise member 106 of the pattern holder 104.

The apparatus 12 may also be used for other operations where the workpiece W is not rotating, for instance when the operator wants to cut flutes in the workpiece. A locking mechanism, indicated generally at 172, is mounted on the first frame element and is operable to lack the spindle 40 thereby to hold the workpiece against rotation about its longitudinal axis.

Figure 9:
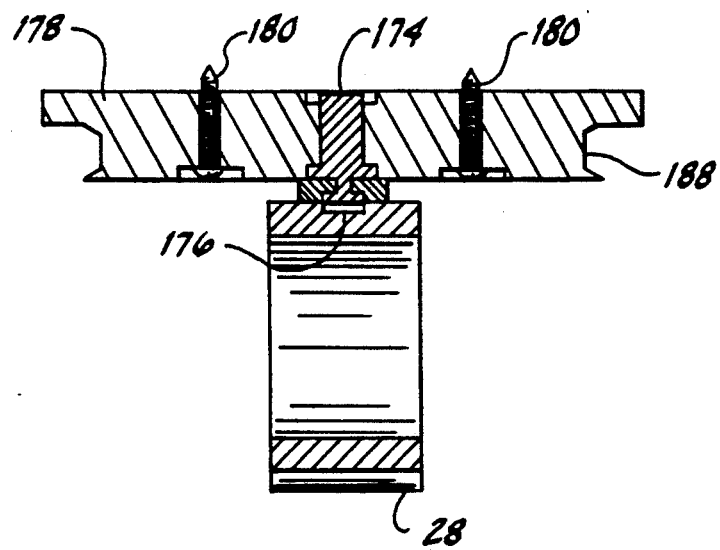
Figure 10:
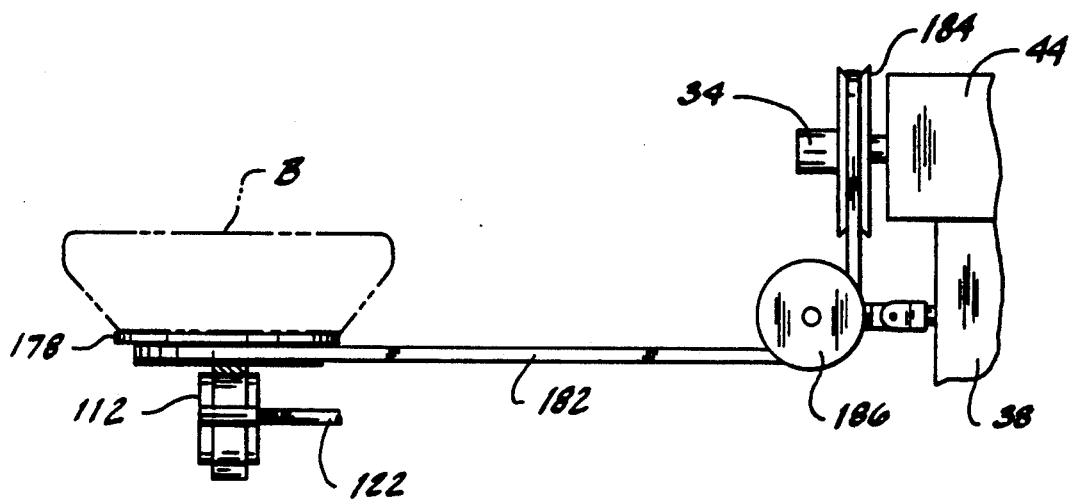
FIG. 10 is a schematic showing the apparatus set up for milling using the platform.

As shown schematically in FIG. 10, the apparatus 12 of the present invention is also readily converted for milling operations on workpieces, such as the bowl B shown in phantom, which are rotated about a generally vertical axis. To convert the apparatus 12, the pattern holder 104 is removed from the collar 110, and an axle 174 is inserted into a channel 176 oil the top of the strut 112 extending from the collet 114 to the collar (FIG. 9). A generally disc-shaped platform 178 is slipped onto the upper end of the axle 174 and releasably secured by a suitable fastener (not shown). The platform 178 is free to rotate about a generally vertical axis corresponding generally to the longitudinal axis of the axle 174. A workpiece such as bowl B is mounted on the platform 178 by screws 180 extending through the platform into the bottom of the bowl. To rotate the platform 178, the first motor 88 is connected to the platform by a belt 182. The belt extends over a pulley 184 formed in the chuck 34, downwardly on either side and under a pair of direction changing pulleys 186 mounted for rotation on the pedestal (see FIG. 2). The belt 182 makes a 90° turn and extends to and around the platform 178 in a pulley groove formed 188 in the base of the platform.

Figure 7:
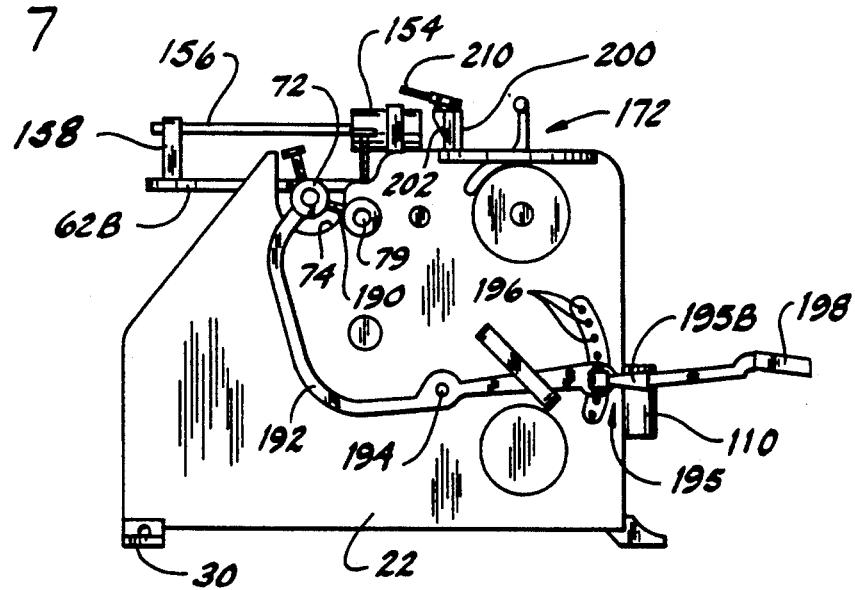
FIG. 7 is a left side elevation of the apparatus.

As shown in FIG. 7, the router support platform 62 may also be swung upwardly as needed to position the router 10 for operation on the bowl B. The workpiece from which a bowl B will be formed is typically several inches higher than the upper edge of a workpiece W supported between the chuck 34 and spindle 40. Therefore, in order for the router 10 to be in position to mill out the center of the bowl B, it must be moved upwardly. The ends of the first support rail 72 are connected by links 190 to corresponding ends of the third support rail 79, and a curved lever 192 mounted by a pin 194 to the first frame element 22 receives the first support rail 72 in a yoke (not shown) at one end of the lever. A fourth latch, indicated generally at 195, is mounted on the lever 192 and includes a pin 195A which is biased into one of a plurality of openings 196 in the first frame element 22 to hold the lever 192 in a selected position (FIG. 2). To swing the router support platform 62 upwardly, the latch pin 195A is withdrawn from its opening 196 by depressing a lever 195B. A handle 198 at the end of the curved lever 192 projecting forwardly of the apparatus 12 is grasped and forced downwardly causing the lever to swing the first support rail 72 about the longitudinal axis of the third support rail 79. The first support rail 72 lifts the router support platform 62 and moves it forwardly. Control of the front to back positioning of the router 10 is carried out by operation of the third electric motor 154 as described above. The front end of the router support platform 62 is supported by the follower 140, which rests on the bowl B. A roller bearing attachment (not shown) may be connected to the bottom of the follower 140 to allow the bowl to turn freely under the follower as it supports the router 10. In its lowest position, the ends of the first support rail 72 rest in the U-shaped recesses 74 in the first and second frame elements 22, 24.

As shown in FIG. 6, the seat 64 which supports the router 10 is mounted to the first member 62A of the router support platform 62 for pivoting about an axis extending generally front to back of the apparatus 12. (For clarity, the third motor 154, lead screw 156 and lug 158 have not been shown in FIG. 6). A semi-circular portion 200 of the seat 64 is in face to face relation with a corresponding semi-circular portion 202 of the first member 62A. The semi-circular portions 200, 202 are connected by an axle 204 which permits the seat 64 to pivot. A third latch (broadly "means for selectively locking the seat") is mounted on the semi-circular portion 202 of the first member and holds the seat 64 in one of a predetermined number of angular orientations relative to the first member 62A thereby to position the router 10 at a selected angle of inclination relative to the bowl B. A pin 206 of the third latch is biased downwardly into one of a plurality of arcuately spaced openings 208 in the semi-circular portion 200 of the seat 64. Depressing the third latch's lever 210 withdraws the pin 206 from the opening 208 and allows the seat 64 to be pivoted to a new position. By swiveling the router 10 so that the blade is inclined to the vertical, the router is in position to mill the outside of the bowl B. Changing the angle of inclination of the router blade changes the style of cut made in the bowl.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for turning and, by attachment of a milling device thereto, simultaneously milling a workpiece to form the workpiece with predetermined designs including a generally spiral cut, the apparatus comprising:

a frame having a front, a back and laterally opposite sides, and including a chuck and a spindle spaced laterally of the chuck, the chuck and the spindle mounting respective opposite ends of the workpiece for rotation generally about its longitudinal axis;

carriage means adapted for mounting the milling device thereon;

means for supporting said carriage means on the frame for movement generally side-to-side of the frame and longitudinally of the workpiece;

a first variable speed electric motor operatively connected to the chuck for driving the rotation of the workpiece about its longitudinal axis;

a first control for controlling the first motor to selectively set the rotational speed of the workpiece;

a second variable speed electric motor operatively connected to said carriage means for driving movement of said carriage means side-to-side of the frame and generally longitudinally of the workpiece; and a second control for controlling the second motor to selectively set the speed of said carriage means as it moves longitudinally of the workpiece such that spiral cuts of different predetermined configurations may be automatically made in the workpiece by the milling device by setting the appropriate relative speeds of the first motor and second motor with the first and second controls;

the first control comprising means for connecting the first motor to a power supply and means for selectively controlling the voltage applied to the first electric motor from the power supply and the second control comprising means for connecting the second electric motor to a power supply and means for selectively controlling the voltage applied to the second electric motor from the power supply, said means for selectively controlling the voltage applied to the first electric motor being operable for selecting the speed of the first electric motor over a substantially continuous range of speeds, and said means for selectively controlling the voltage applied to the second electric motor being operable for selecting the speed of the second electric motor over a substantially continuous range of speeds;

said carriage means comprising a seat for mounting and supporting the milling device, the seat being mounted on said carriage means for pivoting generally about an axis extending generally front to back of the frame.

2. Apparatus as set forth in claim 1 further comprising switch means for signaling the second control to deactivate the second electric motor when said carriage means reaches a predetermined location.

3. Apparatus as set forth in claim 2 wherein said switch means is selectively positionable to change the location at which the second electric motor is deactivated.

4. Apparatus as set forth in claim 3 wherein said switch means comprises a first switch and a second switch each slidably mounted of said support means, each switch being operable to deactivate the second electric motor upon engagement with said carriage means.

5. Apparatus as set forth in claim 1 further comprising means for holding a pattern, said carriage means comprising a follower engageable with the pattern in said pattern holding means and following the contour of the pattern as the carriage means moves generally longitudinally of the workpiece for moving said carriage means and milling device mounted thereon in a generally vertical direction transverse to the lengthwise extension of the workpiece for automatically forming the workpiece into a selected shape.

6. Apparatus as set forth in claim 5 wherein said pattern holding means comprises a vise member pivotally mounted on said pattern holding means for selectively swinging about an axis extending generally front to back of the frame and transversely to the lengthwise extension of the workpiece to position the pattern at an angle of inclination relative to the workpiece, and means for locking said vise member in one of a predetermined number of angles of inclination.

7. Apparatus as set forth in claim 5 wherein the apparatus comprises a plurality of patterns having different configurations for forming workpieces into different predetermined shapes.

8. Apparatus as set forth in claim 1 wherein said carriage means further comprises means for selectively locking the seat in one of a plurality of predetermined angular orientations thereby to position the milling device at a selected angle of inclination relative to the workpiece.

9. Apparatus as set forth in claim 2 wherein said carriage means comprises a saddle and milling device support means for supporting the milling device, said milling device support means including first and second members, said first member being adapted for mounting the milling device thereon and being slidably and telescopically received in the second member for extension and retraction relative thereto in a generally horizontal direction front to back of the frame, the saddle being operatively connected to the second electric motor such that the saddle moves generally longitudinally of the workpiece upon activation of the second electric motor, the saddle being adapted to engage and move said milling device support means.

10. Apparatus as set forth in claim 9 wherein said milling device support means further comprises a third electric motor mounted on its first member and operatively connected to its second member, the third electric motor being operable upon activation thereof to selectively extend or retract the first member relative to the second member.

11. Apparatus as set forth in claim 9 wherein said milling device support means is pivotally mounted on said support means for movement about an axis extending generally side-to-side of the frame.

12. Apparatus as set forth in claim 1 further comprising axle means adapted for mounting on said apparatus and a rotary platform adapted for mounting on said axle means to support a workpiece, such as a bowl, independently of the chuck and the spindle, and means for operatively connecting said first electric motor to said rotary platform so that the first motor may rotate the rotary platform about a generally vertical axis.

13. Apparatus for turning and, by attachment of a milling device thereto, simultaneously milling a workpiece to form the workpiece with predetermined designs, the apparatus comprising:

a frame having a front, a back and laterally opposite sides, and including a chuck and a spindle spaced laterally of the chuck, the chuck and the spindle mounting respective opposite ends of the workpiece for rotation generally about its longitudinal axis;

carriage means adapted for mounting the milling device thereon;

means for supporting said carriage means on the fame for movement generally side-to-side of the frame and longitudinally to the workpiece;

a first motor operatively connected to the chuck for driving the rotation of the workpiece about its longitudinal axis;

a second motor operatively connected to said carriage means for driving movement of said carriage means side-to-side of the frame and generally longitudinally of the workpiece;

means for holding a pattern, said carriage means comprising a follower engageable with the pattern in said pattern holding means and following the contour of the pattern as the carriage means moves generally longitudinally of the workpiece for moving said carriage means and milling device mounted thereon in a generally vertical direction transverse to the lengthwise extension of the workpiece for automatically forming the workpiece into a selected shape;

said pattern holding means comprising a vise member pivotally mounted on said pattern holding means for selectively swinging about an axis extending generally front to back of the frame and transversely to the lengthwise extension of the workpiece to position the pattern at an angle of inclination relative to the workpiece, and means for locking said vise member in one of a predetermined number of angles of inclination.

14. Apparatus as set forth in claim 13 wherein the apparatus further comprises a plurality of patterns having different configurations for forming workpieces into different predetermined shapes.

15. Apparatus for use with a milling device for milling a workpiece, the apparatus comprising:

a frame having a front, a back and laterally opposite sides, and including a chuck and a spindle spaced laterally of the chuck, the chuck and the spindle mounting respective opposite ends of the workpiece for rotation generally about its longitudinal axis;

carriage means adapted for mounting the milling device thereon;

means for supporting said carriage means on the frame for movement generally side-to-side of the frame and longitudinally of the workpiece;

a first motor operatively connected to the chuck for driving the rotation of the workpiece about its longitudinal axis;

a second motor operatively connected to said carriage means for driving movement of said carriage means side-to-side of the frame and generally longitudinally of the workpiece;

said carriage means comprising a seat for mounting and supporting the milling device, the seat being mounted on said carriage means for pivoting generally about an axis extending generally front to back of the frame, and means for selectively locking the seat in one of a plurality of predetermined angular orientations thereby to position the milling device at a selected angle of inclination relative to the workpiece.

16. Apparatus as set forth in claim 15 wherein said carriage means further comprises means for supporting the milling device seat, said seat support means first and second members, said first member being adapted for mounting the milling device seat thereon and being slidably and telescopically received in the second member for extension and retraction relative thereto in a generally horizontal direction front to back of the frame.

17. Apparatus as set forth in claim 16 wherein said milling device seat support means further comprises a third electric motor mounted on its first member and operatively connected to its second member, the third electric motor being operable upon activation thereof to selectively extend or retract the first member relative to the second member.

18. Apparatus as set forth in claim 16 wherein said milling device seat support means is pivotally mounted on said means for supporting said carriage means for movement about an axis extending generally side-to-side of the frame.

19. Apparatus for use with a milling device for milling a workpiece, the apparatus comprising:

a frame having a front, a back and laterally opposite sides, and including a chuck and a spindle spaced laterally of the chuck, the chuck and the spindle mounting respective opposite ends of the workpiece for rotation generally about its longitudinal axis;

carriage means adapted for mounting the milling device thereon;

means for supporting said carriage means on the frame for movement generally side-to-side of the frame and longitudinally of the workpiece;

a first motor operatively connected to the chuck for driving the rotation of the workpiece about its longitudinal axis;

a second motor operatively connected to said carriage means for driving movement of said carriage means side-to-side of the frame and generally longitudinally of the workpiece;

said carriage means comprising a saddle and milling device support means for supporting the milling device, said milling device support means including first and second members, said first member being adapted for mounting the milling device thereon and being slidably and telescopically received in the second member for extension and retraction relative thereto in a generally horizontal direction front to back of the frame, the saddle being operatively connected to the second electric motor such that the saddle moves generally longitudinally of the workpiece upon activation of the second electric motor, the saddle being adapted to engage and move said milling device support means.

20. Apparatus for turning and a workpiece, the apparatus comprising:

a frame having a front, a back and laterally opposite sides, and including a chuck and a spindle spaced laterally of the chuck, the chuck and the spindle mounting respective opposite ends of the workpiece for rotation generally about its longitudinal axis;

carriage means adapted for mounting the milling device thereon;

means for supporting said carriage means on the frame for movement generally side-to-side of the frame and longitudinally of the workpiece;

a first motor operatively connected to the chuck for driving the rotation of the workpiece about its longitudinal axis;

a second motor operatively connected to said carriage means for driving movement of said carriage means side-to-side of the frame and generally longitudinally of the workpiece;

axle means adapted for mounting on said apparatus and a rotary platform adapted for mounting on said axle means to support a workpiece, such as a bowl, independently of the chuck and the spindle, and means for operatively connecting said first electric motor to said rotary platform so that the first motor may rotate the rotary platform about a generally vertical axis.

21. Apparatus for use with a milling device for milling a workpiece, the apparatus comprising:

a frame having a front, a back and laterally opposite sides, and being constructed for holding the workpiece;

carriage means adapted for mounting the milling device thereon;

means for supporting said carriage means on the frame;

said carriage means comprising a seat for mounting and supporting the milling device, the seat being mounted on said carriage means for pivoting generally about an axis extending generally front to back of the frame, and means for selectively locking the seat in one of a plurality of predetermined angular orientations thereby to position the milling device at a selected angle of inclination relative to the workpiece;

said carriage means further comprising means for supporting the milling device seat, side seat support means first and second members, said first member being adapted for mounting the milling device seat thereon and being slidably and telescopically received in the second member for extension and retraction relative thereto in a generally horizontal direction front to back of the frame.

* * * * *